United States Patent [19]

Gamble

[11] 4,029,980
[45] June 14, 1977

[54] ROTARY ELECTRIC MOTOR

[75] Inventor: John Griffith Gamble, Simsbury, Conn.

[73] Assignee: Veeder Industries, Inc., Hartford, Conn.

[22] Filed: Feb. 4, 1975

[21] Appl. No.: 546,938

[52] U.S. Cl. .............................. 310/112; 310/257
[51] Int. Cl.² ........................................ H02K 21/14
[58] Field of Search ............... 310/156, 162–164, 310/257, 112, 114, 125, 126, 86, 90

[56] References Cited

UNITED STATES PATENTS

| | | | |
|---|---|---|---|
| 2,582,652 | 1/1952 | Petersen | 310/164 |
| 2,814,746 | 11/1957 | Boerdijk | 310/164 |
| 2,993,131 | 7/1961 | Trevitt | 310/90 X |
| 3,219,862 | 11/1965 | Kieffert | 310/257 X |
| 3,234,418 | 2/1966 | Tomaro, Jr. | 310/164 |
| 3,437,897 | 4/1969 | Lenny | 310/257 X |
| 3,495,111 | 2/1970 | Haydon | 310/257 X |
| 3,560,775 | 2/1971 | Welter | 310/257 X |
| 3,652,884 | 3/1972 | Uuffray | 310/257 X |
| 3,733,504 | 5/1973 | Dennis | 310/86 |

Primary Examiner—Donovan F. Duggan
Attorney, Agent, or Firm—Prutzman, Hayes, Kalb & Chilton

[57] ABSTRACT

A clock with a rotary drive motor having a pair of axially aligned stator subassemblies with identical molded frame parts with interfitting end portions rotatably supporting a permanent magnet rotor and take-off gears. A separate axially extending U-shaped pole piece is mounted on each frame part to provide four stator poles equiangularly spaced about the axis of the rotor, and each frame part forms a coil bobbin for winding a stator coil for the respective pole piece.

4 Claims, 7 Drawing Figures

ROTARY ELECTRIC MOTOR

BRIEF SUMMARY OF THE INVENTION

The present invention relates generally to rotary electric motors and more particularly to a new and improved rotary electric motor having notable use as a battery powered clock motor for example in automobile clocks.

It is a primary aim of the present invention to provide a new and improved battery powered clock motor which can be produced at a low cost and which provides reliable operation over a long service free life to ensure accurate clock performance.

It is another aim of the present invention to provide a new and improved clock motor which can be compactly assembled for driving a multiple wheel clock counter for example for meeting the strict space limitations in automobile clock applications.

It is a further aim of the present invention to provide a new and improved rotary electric motor having few parts which may be economically manufactured and assembled.

It is another aim of the present invention to provide a new and improved rotary electric motor which can be employed as a stepping motor for intermittent or incremental operation or as a synchronous type motor for continuous operation.

It is a further aim of the present invention to provide a new and improved rotary electric motor having an improved torque/power ratio and having notable use in low torque, low power applications either as a stepping motor or as a continuous motor.

It is another aim of the present invention to provide a new and improved rotary electric motor of the type having a permanent magnet rotor and a four pole stator and employing a magnetic interaction between its rotor and stator providing improved motor performance.

Other objects will be in part obvious and in part pointed out more in detail hereinafter.

A better understanding of the invention will be obtained from the following detailed description and the accompanying drawings of illustrative applications of the invention.

BRIEF DESCRIPTION OF THE DRAWINGS

In the drawings:

FIGS. 5 and 6 are enlarged axial section views of two embodiments of an armature of the clock motor; and FIG. 7 is an enlarged transverse section view showing a modified stator core design of the clock motor.

DESCRIPTION OF THE PREFERRED EMBODIMENTS

Figure 1:
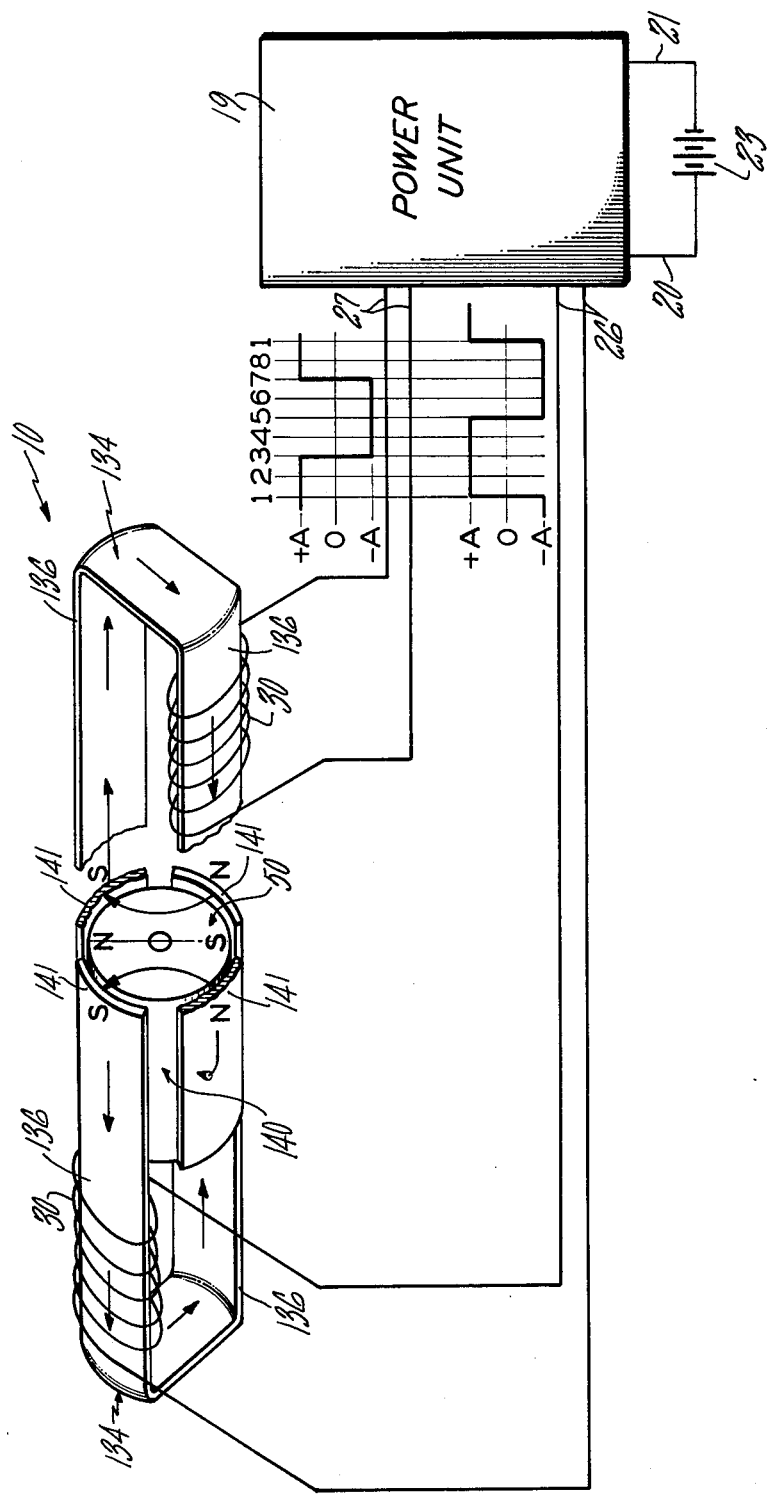
FIG. 1 is a generally diagrammatic view, partly broken away and partly in section, of an embodiment of the rotary electric motor of the present invention.

Referring now to the drawings in detail wherein like numerals indicated like parts throughout the several figures, an embodiment 10 of a rotary electric motor of the present invention is employed as a battery powered synchronous clock motor for driving a clock counter 11 having four coaxial counter or time display wheels 12–15. For example, the clock 18 may be employed in an automobile and with the rotary motor 10 suitably connected to be powered by the automobile battery.

Referring to the diagrammatic representation of FIG. 1, the motor 10 comprises a suitable power unit 19 having a pair of input leads 20, 21 for connecting the power unit to a pair of identical field or stator coils 30. The power unit 19 to a suitable battery power source 23 and two pairs 26, 27 of output leads for separately connecting the power unit to a pair of identical field or stator coils 30. The power unit 19 is suitably designed to supply the same full wave AC power to each coil 30 but with the AC power being supplied to the two coils 30 in a 90° out-of-phase relationship, as shown in FIG. 1 (the connections to the two coils 30 determining the direction of rotation of the motor armature 50). The full wave AC power may for example be supplied in the form of a square wave, as shown in FIG. 1, or if desired in a form more nearly like a true sine wave.

The clock motor 10 drives the clock counter 11 via a suitable speed reduction gear train 34 comprising gears 36–44 which include an input gear 36 of the motor armature of rotor 50 and an output gear 44 of the right hand or lowest order counter wheel 12.

The clock 18 comprises a frame 60 with a pair of spaced parallel side plates 61. The four coaxial time display wheels 12–15 are mounted on a counter shaft 64 extending between the side plates 61 and secured within suitable opposed shaft support openings in the side plates. The motor 10 has an elongated configuration with parallel longitudinal and armature axes which are parallel to and transversely rearwardly offset from the axis of the counter shaft 64. The motor 10 is mounted between the side plates 61 in close association with the display wheels 12–15 to provide a compact clock assembly. Specifically, the motor 10 is mounted between the side plates 61 in engagement therewith by means of two axially outwardly extending pins 65 at each end of the motor 10 secured in conforming support apertures 66 in the side plates 61.

The motor 10 comprises a pair of identical, molded plastic, elongated frame parts 70 which are mounted in a predetermined axial alignment and so that their inner cooperating ends 72 fit together to provide a combined support frame and housing for the armature 50. For that purpose, the molded plastic frame parts 70 have inner parallel and axially spaced transverse end walls 78 with a plurality of axially inwardly extending posts and pins (hereinafter described) which abut and interfit to retain the frame parts 70 in a predetermined angular orientation about the axis of the armature 50. A non-rotating rotor shaft 80 is press fit within openings in opposed bosses 82 of the opposed frame parts 70 to rotatably support the armature 50 along substantially its entire length.

Figure 3:
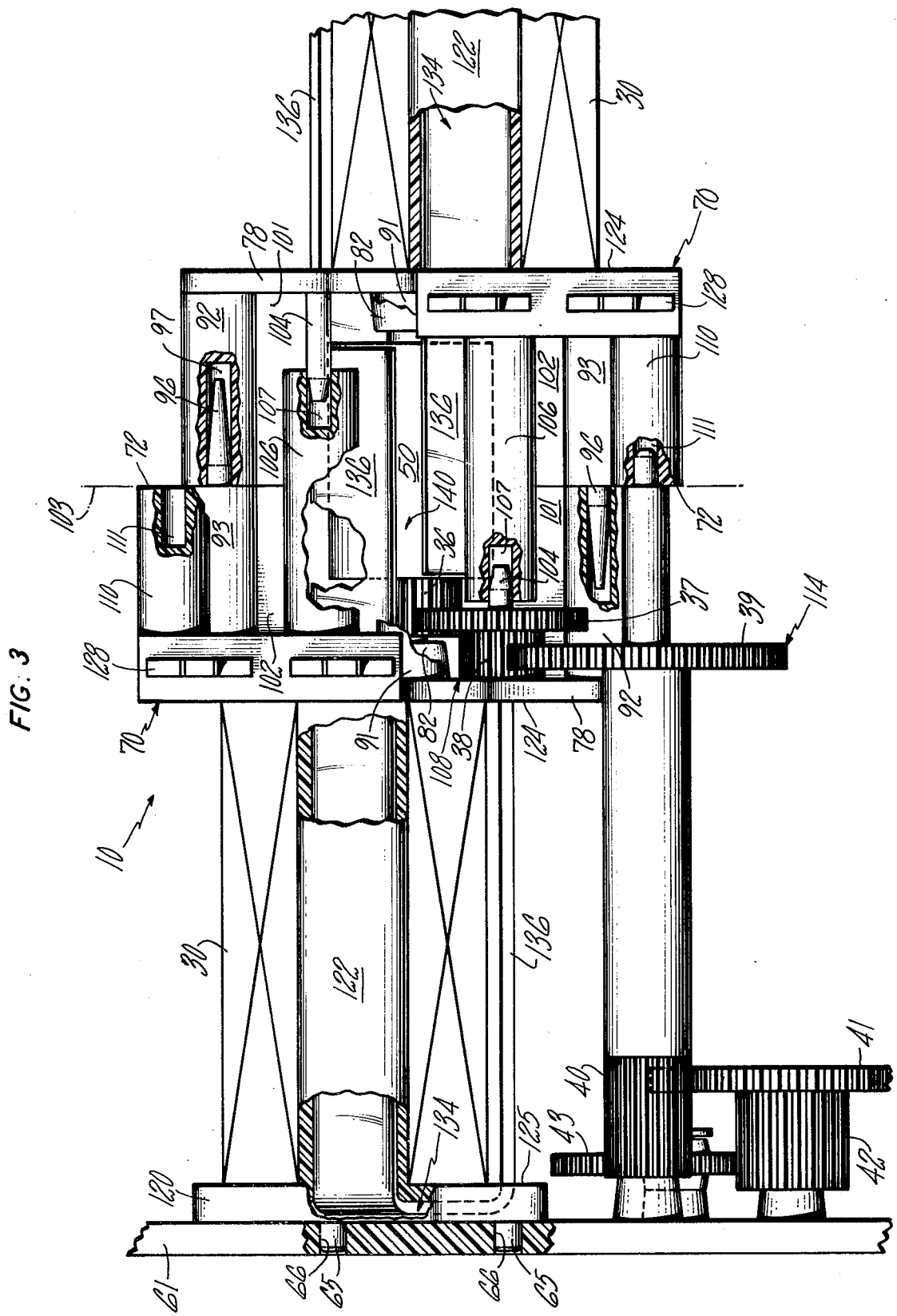
FIG. 3 is an enlarged rear elevation view, partly broken away and partly in section, of the clock motor of FIG. 2.
Figure 4:
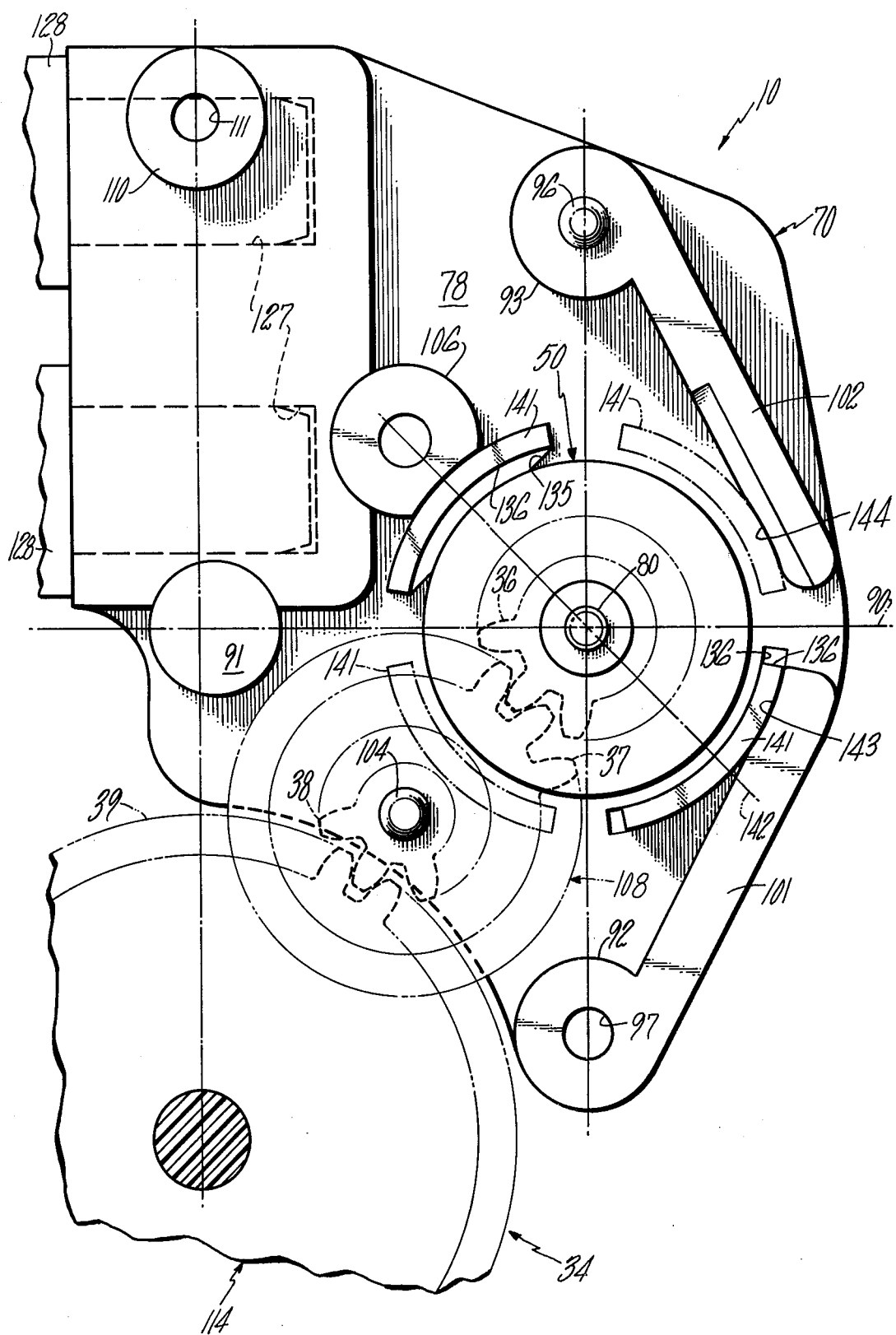
FIG. 4 is an enlarged transverse section view, partly broken away and partly in section, of the clock motor, showing an inner end view of a frame part thereof.

More specifically, the opposed elongated frame parts 70 are mounted in opposed relationship and angularly oriented about the axis of the armature 50 to have a common axially extending plane 90 (extending through the armature axis and the axis of a post 91) shown in broken lines in FIG. 4. Integral axially inwardly extending posts 92, 93 of each frame part 70 are located (equidistantly from the common plane 90 with their axes intersecting a line normal to the plane 90 and also normal to the axis of the armature 50) to provide two pairs of abutting posts 92, 93. The posts 93 have integral axially extending locating pins 96 and the posts 92 have axial openings 97 for receiving the locating pins 96 of the abutting posts 93 and thereby assist in locating and retaining the opposed frame parts in proper assembled relationship. Similarly, axially extending webs or sides 101, 102 and the posts 91 are provided for abutment in a common transverse plane 103 with the abutting posts 92, 93 as seen in FIG. 3. An axially extending tapered pin 104 and an axially extending post 106 with an axial opening 107 are located (equidistantly from the common plane 90 and with their axes intersecting a line normal thereto) for interfitting cooperation as seen in FIG. 3 for further assisting in aligning the opposed frame parts 70. In addition, one of the pins 104, the left hand pin 104 as viewed in FIG. 3, is employed for supporting the take-off compound gear 108 composed of spur gears 37, 38, and the adjacent post 106 and inner end wall 78 cooperate to locate the compound gear 108 for engagement with the gears 36, 39.

An axially extending post 110 having an axial opening 111 is formed on the inner end wall 78 to provide a support for one end of the compound gear 114 composed of the gears 39, 40. The other end of the compound gear 114 is supported by a boss on one of the side plates 61 as seen in FIG. 3.

The elongated frame parts 70 have outer parallel end walls 120 and axially extending tubular connectors 122 integrally connecting the inner and outer end walls 78, 120 and providing supports for the stator coils or windings 30. The outer end walls 120 are integrally formed with two axially outwardly extending mounting pins 65 for mounting the motor assembly on and between the spaced frame side plates 61 as described.

Figure 2:
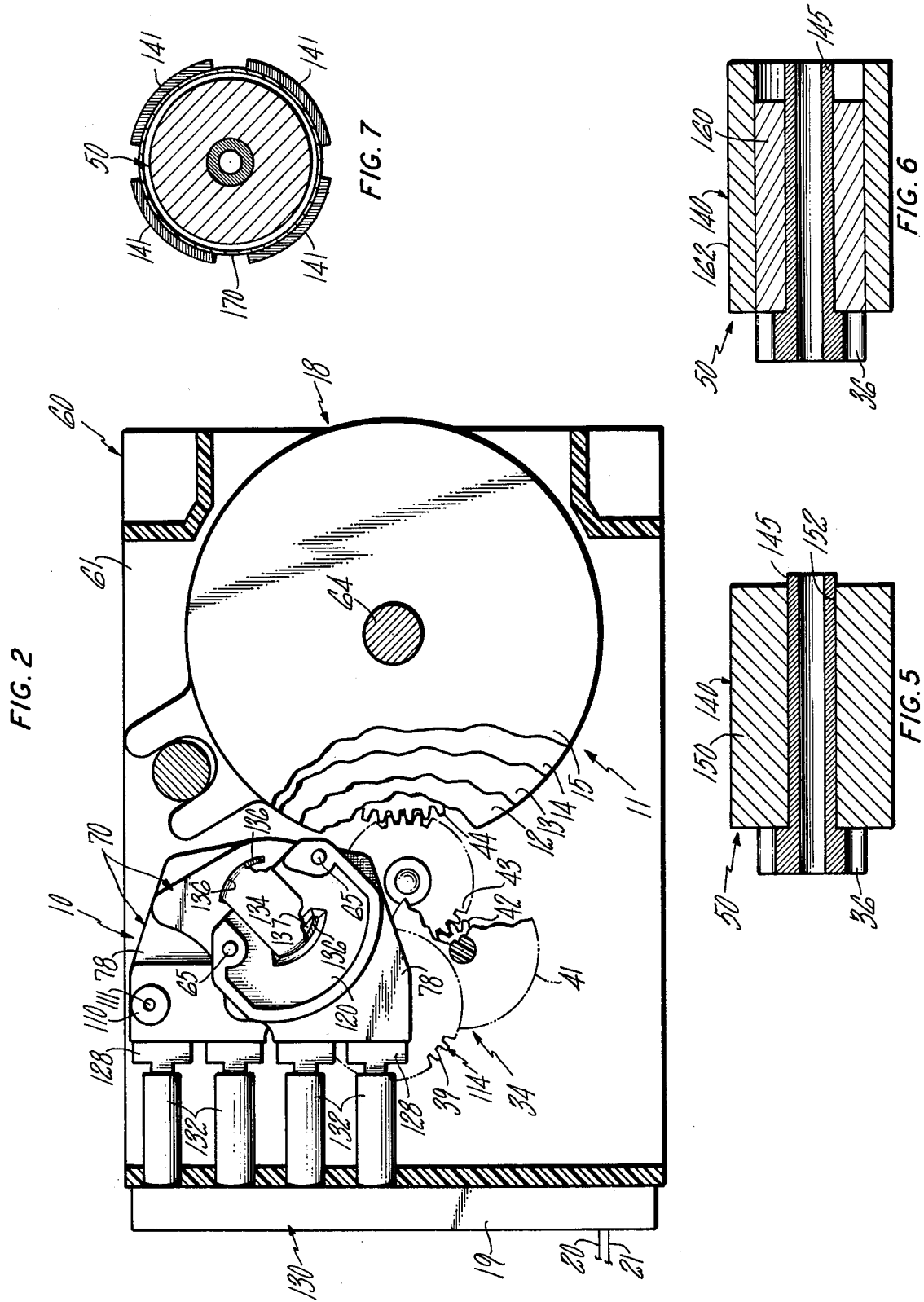
FIG. 2 is a transverse elevation section view, partly broken away and partly in section, of a clock incorporating a design of the rotary electric motor of the present invention.

The inner transverse faces 124, 125 of the end walls 78, 120 are flat and free of obstruction and such that each frame part 70 forms a bobbin for winding the respective stator or field winding 30 directly onto the tubular connector 122. Also, the inner end wall 78 of each frame part is formed with slots 127 (FIG. 4) for suitable male electrical connectors 128 for the respective field winding 30 and whereby the winding leads can be automatically connected to the male connectors 128 in a conventional manner by the coil winding apparatus. As best seen in FIG. 2, the connectors are mounted to extend rearwardly for faciliating direct connection to a suitable printed circuit board assembly 130 providing the power unit 19. The printed circuit board assembly 130 is mounted on the rear of the clock frame and has suitable female connectors 132 for connecting the power unit 19 to the male connectors 28 of the stator windings 30. Thus, after each frame part 70 is used as a bobbin in a suitable coil winding machine and the field coil 30 is wound thereon and connected to the male connectors 128, it can be readily assembled with a like wound frame part, a rotor 50, a rotor support shaft 80 and a take-off compound gear 108 to form the motor assembly described.

A U-shaped soft iron core or pole piece 134 of formed sheet metal and having straight elongated parallel legs 136 with a transverse arcuate shape is mounted on each frame part 70 to complete the field or stator subassembly consisting of the frame part 70, coil 30, connectors 128 and core piece 134. For that purpose, the inner frame end wall 78 is formed with a pair of arcuate openings 135, 136 diametrically opposed about the axis of the rotor 50, the opening 135 being aligned with the tubular connector 122. The outer end wall 120 is formed with a similar arcuate opening 137 in alignment with the tubular connector 122 whereby the U-shaped core piece 134 may be inserted axially inwardly through the frame part 70 with one of its legs passing through the tubular connector 122 and field coil 30 and its other identical leg extending parallel thereto externally of the field coil 30. The parallel legs of each U-shaped core piece 134 extend along substantially the entire length of the cylindrical magnet 140 of the rotor 50 to provide a pair of axially extending diametrically spaced salient poles 141 therefor. Also, the tubular connector 122 and core piece 134 are located so that the core piece 134 is symmetrically mounted relative to an axial plane 142 (shown in broken lines in FIG. 4) extending through the axis of the rotor 50 at an angle of 45° to the common plane 90. Accordingly, the core pieces 134 of the two stator subassemblies provide four salient poles 141 equiangularly spaced about the axis of the rotor 50. Also, the molded frame webs 101, 102 are formed with appropriate arcuate contours 143, 144 respectively for properly radially locating the stator poles 141 equidistantly from the armature axis.

FIGS. 5 and 6 show two armature embodiments having different cylindrical magnet structures. In both embodiments, the armature 50 comprises an elongated bearing sleeve 145 for rotatably supporting the cylindrical magnet 140 and rotor gear 36 of the armature on the fixed rotor shaft 80, and the cylindrical rotor magnet 140 has a diametral magnetic axis and diametrically opposed generally semi-cylindrical magnetic poles (as diagrammatically shown in FIG. 1). In the embodiment of FIG. 5, a single piece cylindrical permanent magnet 150 is provided having an axial opening 152 for securing the permanent magnet 150 onto the bearing sleeve 145. In the embodiment of FIG. 6, a similar but reduced diameter cylindrical permanent magnet 160 is secured onto the bearing sleeve 145, and a non-magnetic shell 162, made for example of non-magnetic stainless steel, is secured onto the cylindrical magnet 160. The stainless steel shell 162 is provided for increasing the moment of inertia of the rotor and for increasing the radial gap between the rotor permanent magnet 160 and the salient stator poles 141, thereby providing for reducing motor noise and improving motor operation in the synchronous motor application described by increasing rotor momentum and reducing magnetic detenting between the rotor magnet and field poles. In both armature embodiments, the permanent magnet 150 and 160 is suitably formed to have the desired magnetic properties. Also, referring to FIG. 7, a thin wall sleeve of ferromagnetic material (i.e., having a wall thickness of 0.030 in. in the shown embodiment) may be mounted coaxially about the armature permanent magnet between the fixed stator poles and rotatable permanent magnet to further reduce the magnetic detenting between the stator and armature without it is believed negatively affecting motor efficiency. For example, a thin wall sleeve 170 of soft iron (adapted to be magnetically saturated in a circumferential direction by the stator field) may be fixed within the salient poles 141 coaxially about the rotor magnet as seen in FIG. 7.

The rotor 50 is synchronously rotated at an RPM established by the frequency of the full wave AC power supplied to the two stator coils 30. Such rotation, although continuous at substantially constant speed, can be considered to be effected in eight equal increments or steps of 45° for each revolution of the armature 50. More specifically, when a magnetic field is established by only one of the stator subassemblies between its pair of diametrically opposed stator poles 141 in either direction (and the magnetic field established by the other stator subassembly is essentially zero — i.e., at the point of reversal of its magnetic field), the magnetic axis of the rotor is urged into alignment with the single pair of active poles. Accordingly, four equiangularly or 90° spaced rotor positions are established at the four points during a full power cycle where the coils are individually energized. Each intermediate or 45° position of the rotor 50 is established when the field between the trailing pair of field poles substantially equals the field between the leading pair of field poles. A diagrammatic representation of the rotor position at an exemplary 45° position and showing the established magnetic circuit at that position is shown in FIG. 1.

Specifically, with the armature in an intermediate or 45° position as shown in FIG. 1, the established magnetic circuit passes through the rotor permanent magnet between adjacent field poles of opposite polarity whereby the two separate U-shaped core pieces are magnetically coupled in series. Accordingly, the two coils 30 are also magnetically coupled in series to substantially increase the flux density for any given number of ampere-turns of each coil 30 to increase the motor torque. Also, by properly relating the strength to rotor magnetic field to the strength of the stator field, the field leakage around the rotor 50 is substantially eliminated, thereby increasing the motor efficiency and reducing its power requirement without reducing rotor torque. Also, because of the series magnetic coupling of the two separate stator core pieces 134 at the intermediate alternate positions of the rotor 50, the field established by each stator subassembly will affect the magnetization of the other stator subassembly. The alternating series magnetic coupling and uncoupling of the two separate stator subassemblies thereby reduces the hysteresis of the motor and provides smooth motor operation with only four stator poles and notwithstanding any variations in the AC power supplied to the field coils 30.

As will be apparent to persons skilled in the art, various modifications, adaptations and variations of the foregoing specific disclosure can be made without departing from the teachings of the present invention.

I claim:

1. A rotary electric motor comprising a rotatable generally cylindrical elongated two pole permanent magnet armature with a generally diametral magnetic axis, two stators for the armature having separate generally U-shaped stator cores, each having exactly two substantially diametrically opposed axially extending elongated stator poles with elongated axially extending substantially diametrically opposed generally rectangular pole faces, the two stators providing an annular arrangement of exactly four said elongated axially extending stator pole faces encircling the elongated generally cylindrical permanent magnet with the pole faces substantially equiangularly spaced thereabout, a single separate coil encircling each separate generally U-shaped stator core for selectively magnetizing the core in opposite directions, and electrical power supply means for supplying full wave AC power to each separate coil and with the AC power supplied to the two separate coils being in generally 90° out-of-phase relationship.

2. A rotary electric motor according to claim 1 wherein each core is generally U-shaped with two legs having outer ends forming the two diametrically opposed stator poles, and wherein the two cores extend axially from opposite axial ends of the rotatable permanent magnet armature with their stator poles axially overlapping to provide an annular arrangement thereof coaxially about the permanent magnet armature.

3. A rotary electric motor according to claim 1 wherein the electrical power supply means supplies generally square wave AC power to each separate coil.

4. A rotary electric motor according to claim 1 wherein the generally cylindrical permanent magnet has two diametrically opposed permanent magnet poles of generally semi-cylindrical shape.

* * * * *